A. D. SCOTT.
WINDING MACHINE.
APPLICATION FILED APR. 6, 1904.

1,068,825.

Patented July 29, 1913.
6 SHEETS—SHEET 1.

WITNESSES:

INVENTOR
Archibald D. Scott
By his Attorneys,

A. D. SCOTT.
WINDING MACHINE.
APPLICATION FILED APR. 6, 1904.
1,068,825.
Patented July 29, 1913.
6 SHEETS—SHEET 4.
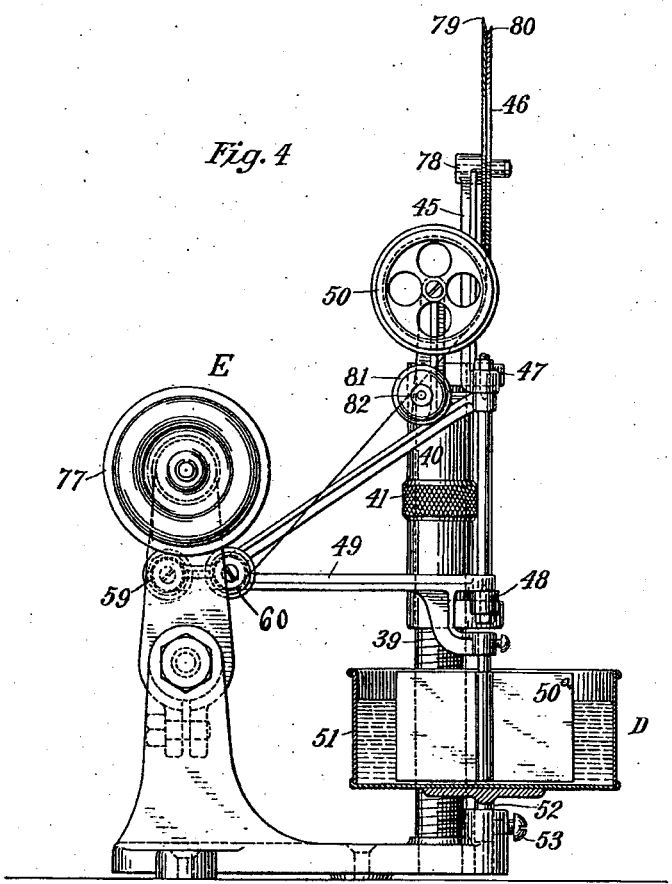
Fig. 4
Fig. 5
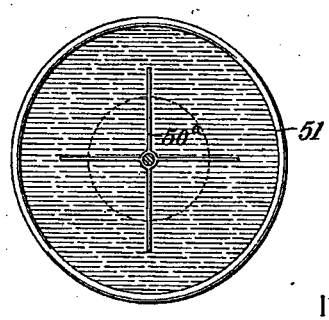
WITNESSES:
INVENTOR
Archibald D. Scott
By his Attorneys, A. D. SCOTT.
WINDING MACHINE.
APPLICATION FILED APR. 6, 1904.
1,068,825.
Patented July 29, 1913.
6 SHEETS—SHEET 5.
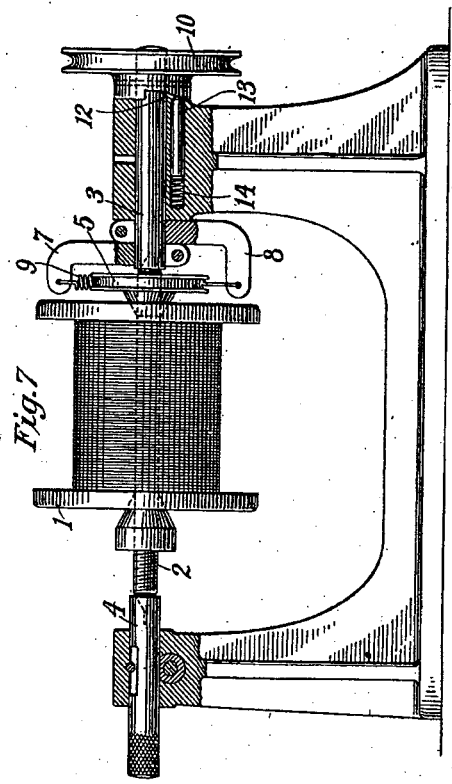
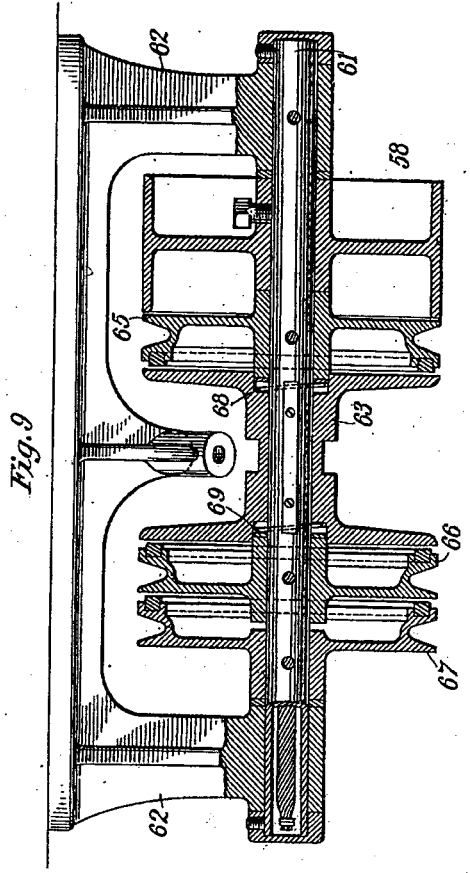
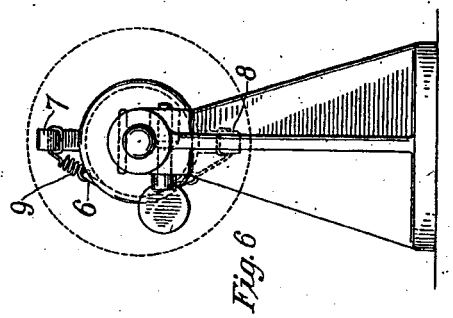
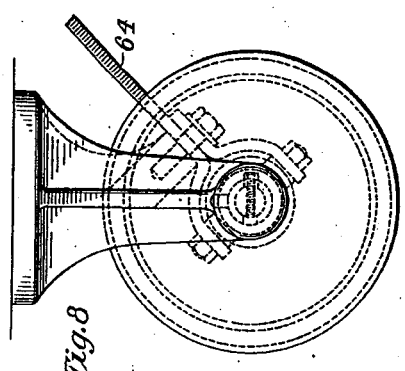
WITNESSES:
INVENTOR
Archibald D. Scott
By his Attorneys, A. D. SCOTT.
WINDING MACHINE.
APPLICATION FILED APR. 6, 1904.
1,068,825.
Patented July 29, 1913.
6 SHEETS—SHEET 6.
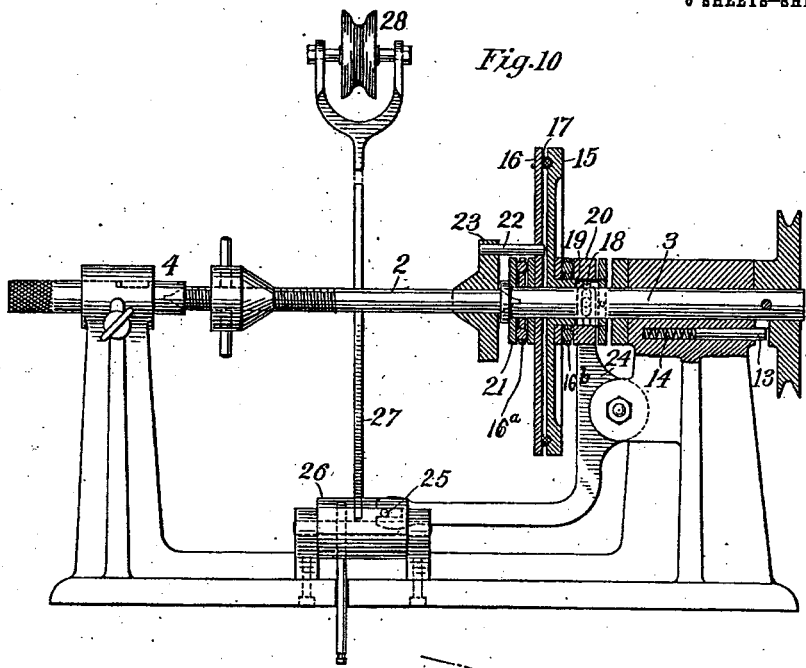
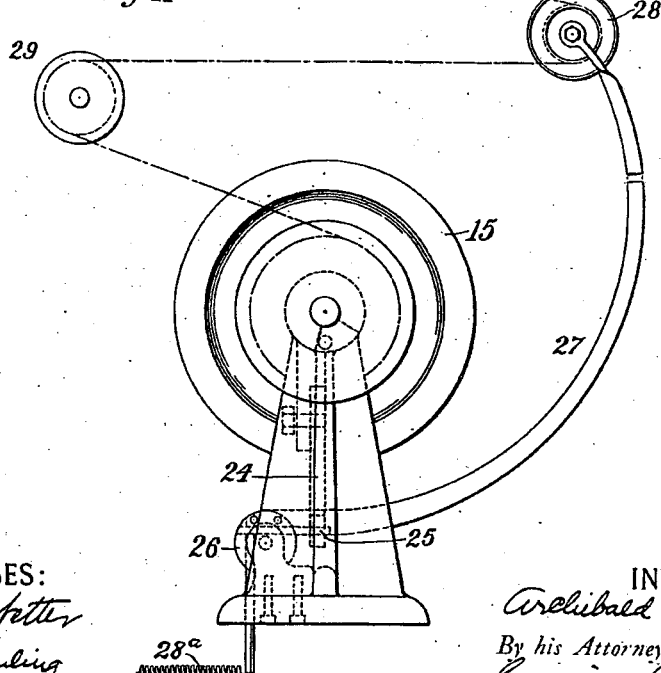
WITNESSES:
INVENTOR
Archibald D. Scott
By his Attorneys,

UNITED STATES PATENT OFFICE.

ARCHIBALD D. SCOTT, OF PROVIDENCE, RHODE ISLAND, ASSIGNOR TO VARLEY DUPLEX MAGNET COMPANY, A CORPORATION OF NEW JERSEY.

WINDING-MACHINE.

1,068,825.  Specification of Letters Patent.  Patented July 29, 1913.

Application filed April 6, 1904. Serial No. 201,831.

*To all whom it may concern:*

Be it known that I, ARCHIBALD D. SCOTT, a citizen of the United States, and a resident of Providence, county of Providence, and State of Rhode Island, have invented a new and useful Improvement in Winding-Machines, of which the following is a specification.

This invention is primarily intended and adapted for the winding of insulated wire into coils for electrical apparatus and it consists in certain improvements upon the machine described in my Letters Patent 807,133, dated December 12, 1905.

Figure 1:
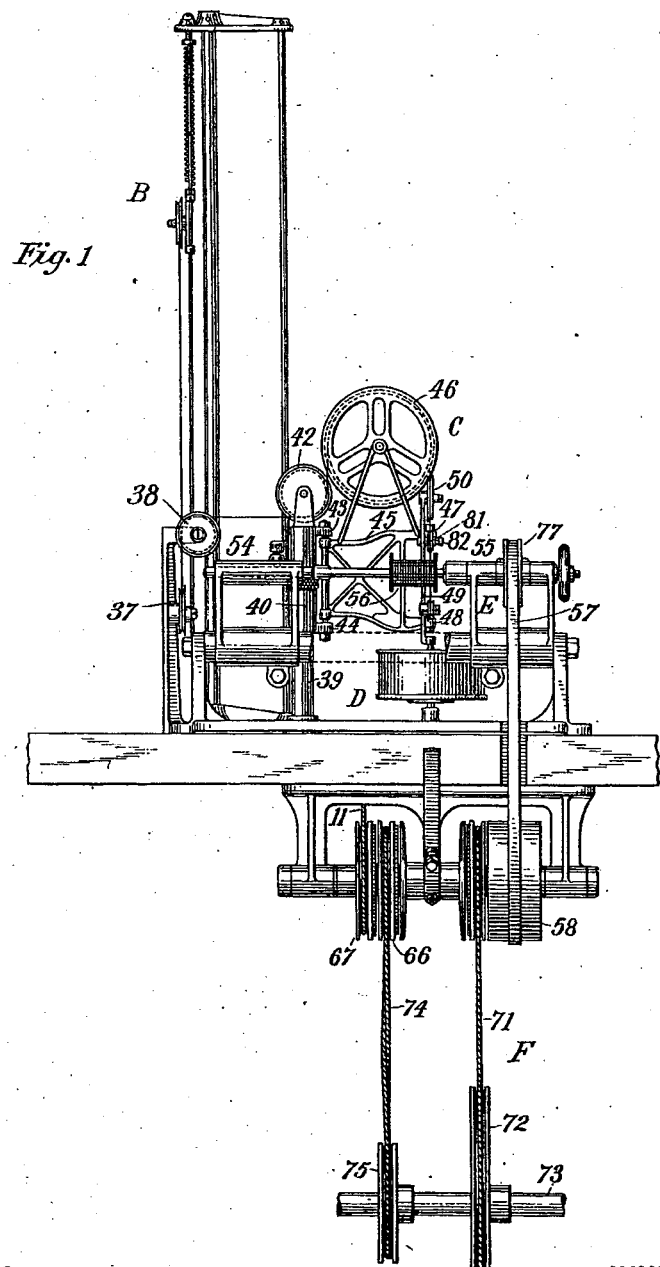
Figure 2:
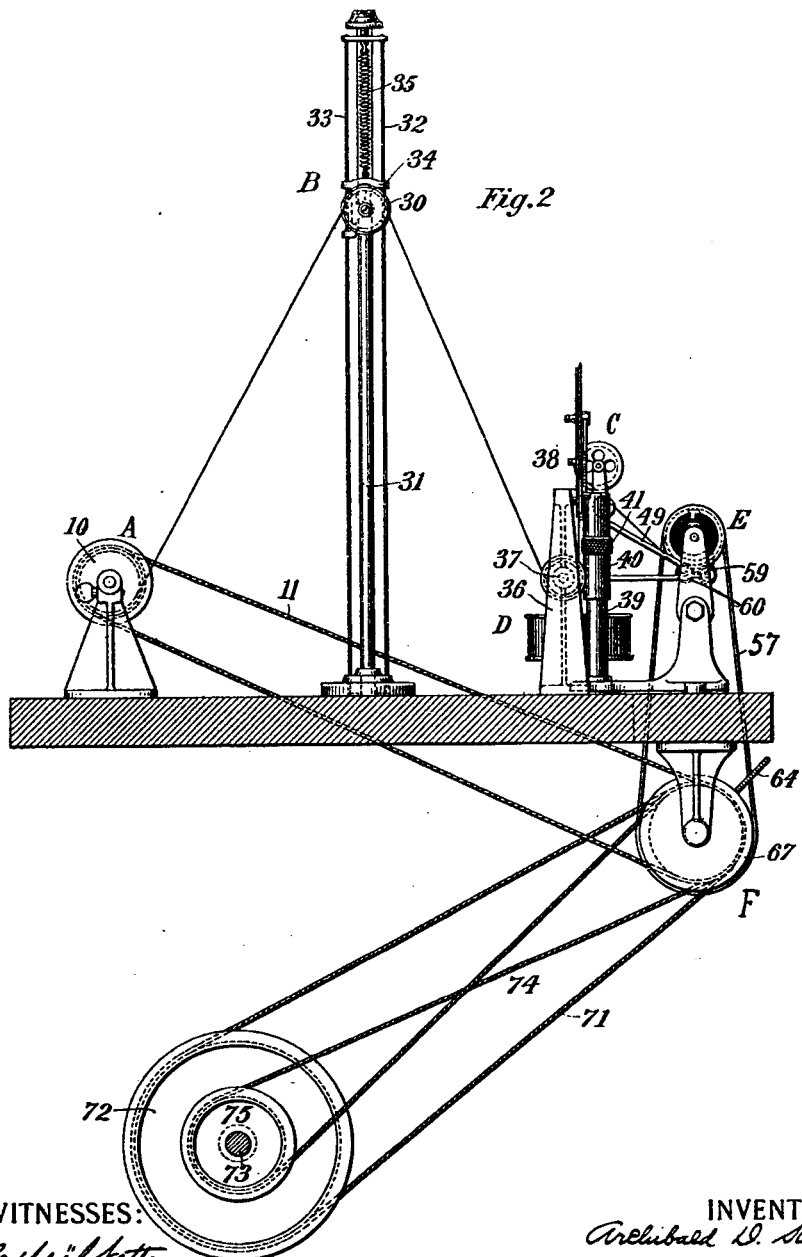
Figure 3:
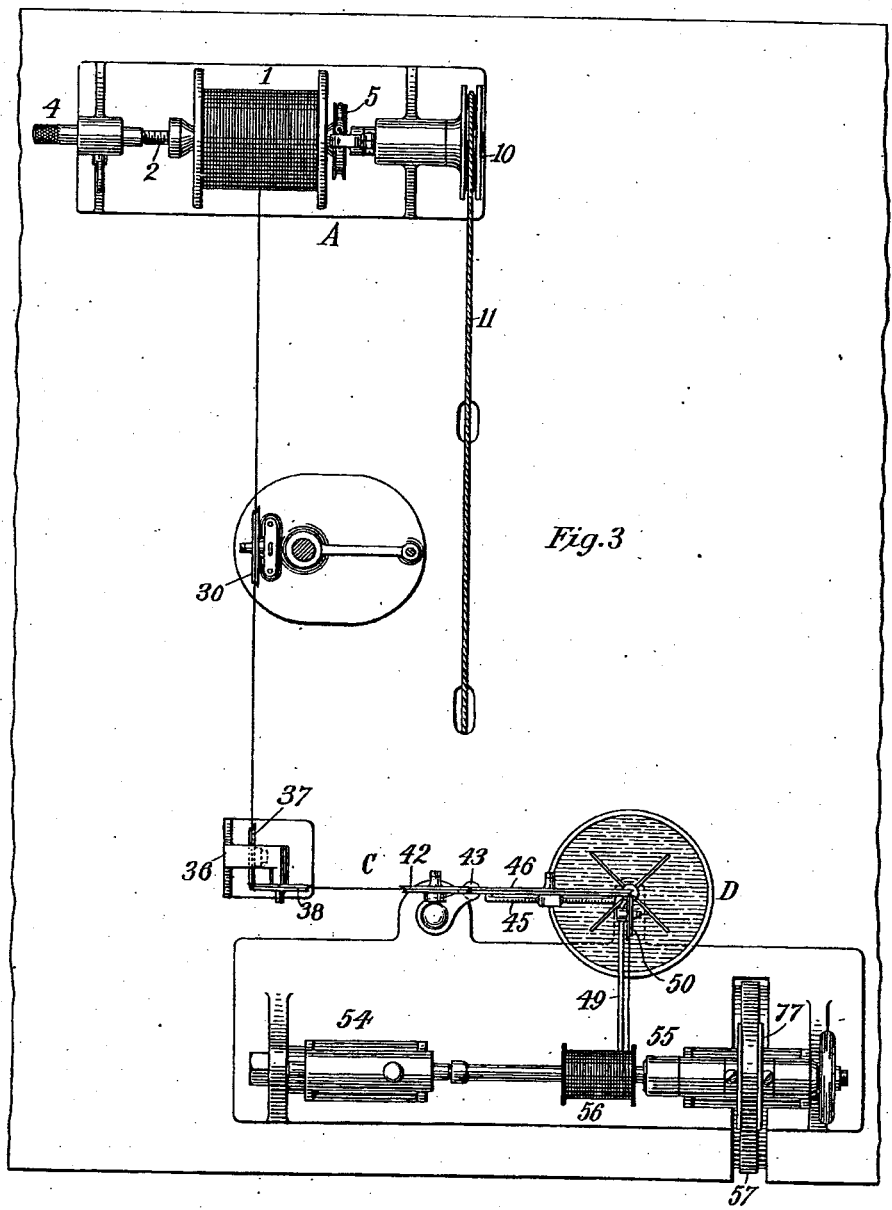

In the accompanying drawings, Figure 1 is a front view of my apparatus. Fig. 2 is a side view of the same. Fig. 3 is a plan. Figs. 4, 5, 6, 7, 8 and 9, are details. Figs. 10 and 11 are a modified form of tension mechanism.

For convenience of description, my machine may be divided into the following general parts, viz: the supply-spool-tension mechanism A, one form of which is shown in detail in Figs. 6 and 7, and a modified form of which is shown in detail in Figs. 10 and 11. A yielding-guide shown at B in Figs. 1 and 2. The crane mechanism, shown at C in Figs. 1 and 2. The crane-steadying-means shown at D in Figs. 1, 2 and 4. The spindle mechanism shown at E. The controlling mechanism shown at F, and in detail in Figs. 8 and 9. Although these various general divisions of the machine are preferably employed in combination, some of them may be omitted and the balance operated in the machine with more or less success. Moreover, in describing the details of these various general parts of the machine, I do not wish to be understood as thereby limiting my claims to such details unless so specified. For example, the corresponding general parts constructed as shown in my Letters Patent No. 835,202, dated November 6, 1906, may be substituted in lieu of one or more of said general parts in this application.

The supply-spool-tension mechanism of the form shown in Figs. 6 and 7, may be described as follows: 1 is the supply-spool mounted upon the spindle 2, mounted in centers in the end of the shaft 3 and piece 4. 5 is a wheel fixed to said spindle and frictionally driven by a cord 6 held in contact with its periphery by the dogs 7 and 8 clamped to the shaft 3. One end of said cord 6 is connected with one of said dogs by the spring 9. The pulley 10 is fixed to the shaft 3 and is driven by the belt 11. 12 is a notch in the face of the hub of the pulley 10, which notch is inclined at one side only. 13 is a pin pressed forward by the spring 14 into said notch and serving to hold the shaft 3 from rotation as wire is drawn off the spool 1 and thus insure that the drawing off of the wire therefrom shall be resisted by the friction on the wheel 5. This pin 13 also acts to prevent the improper driving of the shaft 3 from the reversing mechanism but permits said shaft to revolve in the opposite direction to reverse the direction of the rotation of the spool 1, as will be set forth hereinafter, to backwind the strand thereon.

In the supply-spool-mechanism of the form shown in Figs. 10 and 11, the friction connection between the spindle 2 and shaft 3 is made by the two disks 15 and 16, and the interposed rope or other friction material 17. The disk 15 is fixed against rotation on the shaft 3 by a pin 18 extending from the shaft into a longitudinal slot 19 in the hub of said disk. 20 is the collar of the shifter by which the disk 15 is given its longitudinal movement. The disk 16 is free to rotate upon the shaft 3 but is secured against longitudinal movement thereon by the collar 21 fixed to the end of said shaft. 16$^a$ is a ball-thrust-bearing between the disk 16 and collar 21 and 16$^b$ is a similar bearing between disk 15 and collar 20. The pin 22 connects the disk 16 with the disk 23 fixed to the spindle 2 so that the spindle 2 and disk 16 are rotatably fixed to each other. 24 is the shifter-lever engaging the collar 20 and which is oscillated by the pin 25 in the oscillating hub 26. For oscillating this hub, the arm 27 is fixed thereto and carried thereby, said arm extending upward as shown, and supporting the guide wheel 28. 29 is a fixed guide-wheel. The wire extends from the spool 1 around the guide-wheel 29 and thence around the guide-wheel 28 and any variation in the tension of this wire produces a corresponding variation in the position of the guide-wheel 28 and through the connections described a corresponding variation in the degree of friction between the disks 15 and 16. 28$^a$ is a spring to check the guide-wheel 28 until the tension reaches a determined point. The construction shown in Figs. 10 and 11, therefore, supplies an automatic regulator whereby the tension mechanism acting upon the supply-spool is automatically adjusted to compensate for any variation of tension due to other causes, such as the change in diameter of the coil of wire upon the spool as the winding therefrom progresses. The friction engagement between the disks 15, 16, also serves as a driving connection or engagement between the shafts 3 and 2, to reverse the revolution of the spool 1, when the shaft 3 is revolved as hereinafter set forth. It will be understood that the pin 13 may also be employed in this form of tension mechanism to hold the shaft 3 against rotation when the spool 1 is paying out the wire.

The yielding-guide B consists of a guide-wheel 30 supported by the following mechanism, whereby it is given a long range of movement under tension: 31 is a tall vertical column (say, three feet in height) carrying the parallel vertical guide wires 32, 33, upon which the frame 34 carrying the sheave 30 is guided. Said frame is suspended from the top of the column by the extensible spring 35 having sufficient capacity of extension to permit the vibration of the guide-wheel 30 under its tension throughout a wide range. The strength of the spring 35 will be dependent upon the wire being wound but should be such as to permit the guide-wheel 30 to yield promptly to all variations of tension which would cause the stretching or breaking of the wire being wound. The yielding guide B may be referred to as a secondary tension mechanism and the supply-spool-tension mechanism as a primary tension mechanism.

The crane mechanism C may be described in detail as follows: 36 is a bracket upon which is journaled the wheel 37 in approximately the same plane with the wheel 30, and, also, the wheel 38 in a plane approximately at right angles thereto. The two parts 39 and 40 together form a telescoping column, the post 39 being provided with threads designed to co-act with similar threads formed on the interior surface of the post 40, while 41 is a thumb nut or collar carried by the post 40 for the purpose of enabling the post to be adjusted relatively to the part 39 with facility and convenience. On top of this column is mounted the wheel 42 approximately in the same plane with the wheel 38. The column part 40 is provided with the lugs 43 and 44, between centers connected with which the crane member 45 is mounted. On top of this crane member is mounted the wheel 46 and the crane member is provided with the front lugs 47, 48, between centers connected with which is pivoted the crane member 49 on top of which is mounted the guide-wheel 50. The location is such that the axis of the pivotal connection at the lugs 43 and 44 is substantially tangent to the two wheels 42 and 46 and the axis of the pivotal connection at the lugs 47 and 48 is substantially tangent to the two wheels 46 and 50. Therefore, the strand of wire being wound passes these two pivotal connections without any substantial variation in length or direction for different positions of the crane.

The crane-steadying mechanism D may consist of the following details: To the bottom of the crane-member 49 is secured a fan-shaped retarder comprising downwardly extending vanes 50ª which are immersed in a suitable liquid, such as cylinder oil, contained in the circular receptacle 51, which is supported by a post 52 capable of being fixed at various vertical adjustments by the set screw 53. By this or other suitable means the movements of the thread guide are deadened; or, in other words, retarded against erratic movements.

The spindle-mechanism E comprises the tail-stock 54 and head-stock 55 adapted to center the core of the bobbin or coil receiver 56 and driven by the belt 57 from the pulley 58. 59 is the winding-guide supported on the forward end of the crane part 49, and 60 is a guide-wheel acting as a leader to said winding-guide. The winding-guide 59 is maintained by the crane in such position below the bobbin that the strand of wire running from it to the bobbin is substantially vertical and also that the winding-guide 59 and its leader 60 will just clear the heads of the bobbin in the traversing movements. The requisite adjustment for this purpose is afforded by the already referred to telescopic post 39, 40 and the adjustable support of the receptacle 51.

The controlling mechanism F may be described in detail as follows: 61 is a shaft supported in hangers 62 beneath the table and splined to its double-acting clutch 63 controlled by the shifting-lever 64. On one side, this clutch engages with the pulley 65 revolving freely on said shaft. On the other side, said clutch engages with the pulley 66 also free to revolve on said shaft and which, in turn, frictionally engages with the pulley 67 also free to revolve on said shaft. 68 and 69 are spiral springs interposed between said clutch and each of its adjacent pulleys. 58 is a pulley fixed to said shaft. The pulley 65 is connected by the belt 71 with the pulley 72 on line shaft 73 so that when said clutch engages with said pulley 65 the shaft 61 is driven from the line shaft in the direction to wind. The pulley 66 is connected by the crossed belt 74 with the pulley 75 on the line shaft 73, so that when the clutch is in engagement with the pulley 66 the shaft 61 is driven in the direction for unwinding. The pulley 67 is connected by the belt 11 with the pulley 10 of the tension mechanism. The pulley 58 is connected by the belt 57 with the pulley 77 of the spindle mechanism. When, now, the clutch 63 is moved to the left, the first effect of said movement by reason of the presence of the spring 69 will be to frictionally connect the pulleys 66 and 67 and thus cause the starting of the pulley 10 of the tension mechanism to rotate the same in the direction to reverse rotation of the spool 1, to wind the strand on the latter, the friction connection between the shafts 3 and 2 forming the driving engagement between said pulley 10 and the spool 1. The next effect will be to compress the spring 69 so as to frictionally engage the clutch with the pulley 66 and thus start the shaft 61 and the spindle-pulley 77 in unwinding direction. In this way, it is insured that the movement of the tension mechanism will precede the unwinding movement of the spindle and thereby prevent the production of any slack such as could not be taken up by the spring 35 and might cause the wire being wound to be dismounted from its guide-wheels.

To facilitate the threading or placing of the wire being wound upon the various guide-wheels, said wheels are arranged to overhang their bearings, as shown, and the flange of the wheel next its bearing is made deeper than the other flange. For example, the wheel 46 overhangs its bearing 78 and its flange 79 is deeper than its flange 80. To prevent the spring 35 from causing the unthreading of the wire during the changing of the bobbins, I provide the pair of clamping disks 81 pressed together by the nut 82, between which disks the wire passes and by which the operator can cause it to be clamped and held by setting up the nut 82 preparatory to cutting the wire for changing the bobbin.

The operation is as follows: The machine being threaded for winding, the operator moves the clutch 63 into engagement with the pulley 65 and the winding starts. The spring 35 yields sufficiently to prevent the breaking or stretching of the wire until the supply-spool 1 gets under way. If the form of tension mechanism shown in Figs. 6 and 7 be employed, the operator by movement of the dogs 7 and 8 on the shaft 3 produces the requisite pressure and arc of contact by the cord 6 to produce the desired tension and changes this adjustment from time to time as the winding proceeds to make the tension conform to the lessened diameter of the coil remaining on the supply-spool. If, however, the form of tension mechanism shown in Figs. 10 and 11, be employed, this adjustment is performed automatically. As the winding proceeds, the crane supports the axis of the winding guide 59 in a horizontal plane but permits its movements in that plane to be freely and solely controlled by the strand of wire being wound. Said strand controls the movement of the winding guide, not merely during each traverse across the bobbin, but also by its contact with the head of the bobbin determines when the winding-guide shall change its traversing direction. The running of a wire from one arm of the crane to another in alinement with the pivotal connections thereof prevents movement of the crane due to any irregularity in the tension of the wire. The immersion of the crane vane in the cylinder oil deadens the movements of the crane against external causes of variation, such as the vibration of the supporting table. Should the operator discover any irregularity in the winding he can reverse the operation by throwing the clutch 63 in the opposite direction to engage the pulleys 66, 67, as heretofore set forth and thus cause the wire to be wound from the bobbin back onto the supply-spool again.

It will be understood that the tension mechanism, whether it be of the form shown in Figs. 6 and 7 or Figs. 10 and 11, operates to maintain the proper tension in the strand. When the wire is paying out to be wound on the coil receiver the tension mechanism retards rotation of the supply spool so that the proper tension is maintained for the strand, and when the pulley 10 is revolved to rotate the supply spool to draw the wire from the coil receiver, the frictional connection, irrespective of which form is employed, between the shaft 3 and the shaft 2, forms a slipping connection between said shafts so that the winding of the wire on the spool 1 cannot place the wire under too high tension as the shaft 1 will slip relative to the shaft 3 should the tension in the strand become too high, and it will therefore be seen that the tension mechanism during the backwinding operates to prevent excessive tension.

All of the guides for the wire and the moving supports for said guides shall be constructed as light as is consistent with strength and stiffness, such as the guide wheels 30, 37, 38, 42, 46, 50, 59 and 60, and the crane members 45 and 49.

Having thus described my invention, I claim as new and desire to secure by Letters Patent:

1. In a winding machine, in combination, a frame, a revoluble coil receiver on the frame, a crane carrying a winding guide, mechanism for supporting the crane, whereby the guide may have traversing movements in a right line parallel to the axis of the coil receiver, which movements are substantially free to be controlled by pull of the strand being wound, and fluid means for retarding the movement of the guide.

2. In a winding machine, in combination, a frame, a revoluble coil receiver on the frame, a crane carrying a winding guide, mechanism for supporting said crane whereby the guide may have traversing movements that are substantially free to be controlled by pull of the strand being wound, and which delivers the strand from the guide to the coil receiver at a constant angle relatively to the axis of said coil receiver, and fluid means for retarding the movement of the guide.

3. In a winding machine, in combination, a frame, a revoluble coil receiver on the frame, a winding guide, mechanism for supporting said guide whereby its traversing movements are in a right line parallel to the axis of revolution of the coil receiver and are free to be controlled by the pull of the strands being wound, to uniformly wind the material upon the coil receiver, and means for varying the height of said supporting mechanism relatively to said coil receiver.

4. In a winding machine, in combination, a frame, a revoluble coil receiver on the frame, a winding guide, mechanism for supporting the guide whereby its traversing movements are substantially free to be controlled by the pull of the strand being wound, means whereby the movements of said guide are deadened, and an attachment whereby the position of such supporting and deadening means relatively to said coil receiver may be varied.

5. In a winding machine, in combination, a frame, a revoluble coil receiver on the frame, a winding guide, mechanism for supporting the guide whereby its traversing movements are substantially free to be controlled by the pull of the strand being wound, a supply-spool-tension-mechanism, a reversible driving mechanism and a yielding guide whereby strain upon the wire while being wound in either direction is modified.

6. In a winding machine, in combination, a frame, a revoluble coil receiver, a supply spool, a winding guide, mechanism for supporting the guide whereby its traversing movements are substantially free to be controlled by the pull of the strand being wound, a supply-spool-tension-mechanism, a driving mechanism and connections whereby said tension mechanism is operated from said driving mechanism in a direction to rewind the strand on the supply spool.

7. In a winding machine, in combination, a frame, a revoluble coil receiver on the frame, a winding guide, means for supporting the guide whereby its traversing movements are substantialy free to be controlled by the pull of the strand being wound, a supply spool tension mechanism, a driving mechanism, a driving connection between said driving mechanism and said coil receiver, and a driving connection between said driving mechanism and said tension mechanism whereby the driving connection with said tension mechanism operates in advance of the driving connection with said coil receiver.

8. In a winding machine, in combination, a frame, a revoluble coil receiver on the frame, a supply spool, intermediate guiding mechanism, a tension mechanism, means whereby said tension mechanism is automatically controlled by the tension upon the wire, a driving mechanism, and means whereby said tension mechanism is operated from said driving mechanism in a direction to rewind the wire on the supply spool.

9. In a winding machine, in combination, a frame, a revoluble coil receiver on the frame, a winding guide, mechanism for supporting said guide, and means whereby the movements of said guide are deadened, such means comprising a fluid-containing receptacle and a member connected to said guide and extending into said receptacle.

10. In a winding machine, in combination, a frame, a revoluble coil receiver on the frame, a winding guide, a pivoted crane for said guide and means for deadening the movement of said guide comprising a fluid-containing receptacle and a vane connected to the crane and extending into said receptacle.

11. In a winding machine, a frame, a revoluble coil-receiver on the frame, a swinging arm mounted to have a freely swinging movement on either side of its central position perpendicular to the coil-receiver, said arm having a delivery device, and a vane moved by said arm whereby a predetermined amount of impedance or resistance can be imparted to the movements of said arm.

12. In a winding machine, the combination with a movable member on which the material is to be wound, of means for actuating said member, a guiding arm in position to guide the material on said member and movable axially of said member as the material is being wound, and a fluid retarding device connected to said arm and retarding the said movement of the arm.

In testimony whereof, I have hereunto signed my name in the presence of two subscribing witnesses.

ARCHIBALD D. SCOTT.

Witnesses:
J. A. MILLER, Jr.,
ADA E. HAGERTY.